United States Patent Office 3,583,979
Patented June 8, 1971

3,583,979
PROCESS FOR PREPARING N-AMINOHEX-AMETHYLENIMINE
William D. Lorentz, Philip F. Beal III, and Jekishan R. Parikh, Kalamazoo, Mich., assignors to The Upjohn Company, Kalamazoo, Mich.
No Drawing. Filed May 6, 1969, Ser. No. 822,285
Int. Cl. C07d 41/04
U.S. Cl. 260—239B                          2 Claims

ABSTRACT OF THE DISCLOSURE

This invention relates to a novel process for the preparation of N-aminohexamethyleneimine of the formula

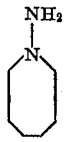
(I)

which comprises heating N-nitrosohexamethyleneimine of the formula

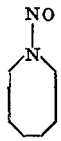
(II)

in a lower-alkanol-water mixture containing a base and an alkali metal hydrosulfite. N-aminohexamethyleneimine (I) is a major reactant in the synthesis of 1-(hexahydro-1H-azepin - 1 - yl) - 3 - (p-tolylsulfonyl) urea, the oral anti-diabetic drug Tolazamide.

BRIEF SUMMARY OF THE INVENTION

N-aminohexamethyleneimine (I) is a known compound and has previously been prepared by subjecting N-nitrosohexamethyleneimine (II) to reduction with lithium aluminum hydride or by catalytic hydrogenation. The present novel process obviates the use of costly and potentially hazardous lithium aluminum hydride. It has marked advantages over the catalytic method, which invariably leads to undesired side reactions and incomplete reduction and, in addition, requires time consuming isolation and purification procedures to obtain the desired N-aminohexamethyleneimine (I). In contrast, reduction of N-nitrosohexamethyleneimine (II) with an alkali metal hydrosulfite under the conditions of the present process, gives a smooth reaction resulting in easy isolation of the desired N-aminohexamethyleneimine (I) in excellent yield, free of unwanted by-products. Furthermore, unlike the catalytic reduction method, the N-nitrosohexamethyleneimine (II) prepared from hexamethyleneimine by well known procedures, can be used in the present process without purification.

The novel process of this invention for the preparation of N-aminohexamethyleneimine (I), comprises heating N-nitrosohexamethyleneimine (II) at elevated temperatures in a lower alkanol (such as methanol or ethanol)-water mixture containing a base (e.g. potassium hydroxide, sodium hydroxide, or lithium hydroxide) and an alkali metal hydrosulfite (e.g., sodium hydrosulfite, potassium hydrosulfite or lithium hydrosulfite).

In carrying out the reaction between N-nitrosohexamethyleneimine (II) and the alkali metal hydrosulfite, the molecular ratio of the latter (hydrosulfite) to the former (II) can be as low as 2.5 to 1. The volume of lower alkanol used can be varied from about 5 to 20 times that of the N-nitrosohexamethyleneimine (II), and the volume of water can be varied from about 5 to 10 times that of II. Sodium hydroxide is as effective in the process as potassium hydroxide. The time required for the completion of the reaction depends upon such factors as the particular hydrosulfite, its solubility, its relative amount in relation to N-nitrosohexamethyleneimine (II), thoroughness of mixing, and the like. Therefore, it will be understood that the optimum reaction time will vary for each set of reaction conditions. Ordinarily, reaction times ranging from about several hours to several days are suitable. After completion of the reaction between II and the hydrosulfite, the thus formed product (I), is readily isolated in high yield from the reaction mixture by conventional means, for example, by first removing the lower alkanol, e.g., by vacuum distillation, then agitating the remainder of the reaction mixture with a base (e.g., potassium hydroxide or sodium hydroxide), allowing said mixture to separate into two layers, discarding the lower layer and retaining the upper layer containing the product (I). Purification of the thus produced N-aminohexamethyleneimine (I) is readily accomplished by vacuum fractional distillation.

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

EXAMPLE 1

N-aminohexamethyleneimine (I)

A three neck, round bottom, 5 l. flask, equipped with an agitator, thermometer, reflux condenser and an inlet connected with a source of nitrogen, has 102.5 g. of N-nitrosohexamethyleneimine (II) placed therein. There is added 2250 ml. of methanol and a solution of 330 g. of potassium hydroxide in 1260 ml. of water. This material is heated to reflux and refluxing continued for about one-half hour, and then 288 g. of sodium hydrosulfite is slowly added. Refluxing is continued for about 1 hour, when an additional 288 g. of sodium hydrosulfite is added. Refluxing is continued for about 5 hours, or until the reaction is complete (as determined by thin layer chromatography). The reaction mixture is cooled, the inorganic salts removed by filtration, and the filter cake washed with 250 ml. of methanol; the washings are added to the filtrate. The methanol is removed from the filtrate containing the product (I) by vacuum distillation at a temperature lower than 50° C. This mixture is cooled to 25° C., 300 g. of potassium hydroxide added, followed by agitation for about 15 minutes, and then allowed to separate into layers. The lower (aqueous) phase is discarded and 25 g. of potassium hydroxide is added to the upper (product) phase. After mixing well, the phases are allowed to separate; the lower (aqueous) phase is discarded and the upper [N-aminohexamethyleneimine (I)] phase is collected. The yield of product (I) is 80.75 g., which is 78.8% of the theoretical weight yield, having a purity of 95.1%, as determined by vapor phase chromatography. Purification by vacuum fractional distillation gives 67.6 g. of N-aminohexamethyleneimine (I), which is 66% of the theoretical weight yield, having a purity of 98.6%, as determined by vapor phase chromatography.

Following the procedure of Example 1 but substituting ethanol for methanol, sodium hydroxide or lithium hydroxide for potassium hydroxide, potassium hydrosulfite or lithium hydrosulfite for sodium hydrosulfite, also yields N-aminohexamethyleneimine (I).

What is claimed is:
1. A process for the production of N-aminohexamethyleneimine which comprises: heating N-nitrosohexamethyleneimine in a lower alkanol-water mixture containing a base, with an alkali metal hydrosulfite.
2. A process in accordance with claim 1 wherein the lower alkanol is methanol, the base is potassium hydroxide and the alkali metal hydrosulfite is sodium hydrosulfite.

References Cited

UNITED STATES PATENTS

| | | | |
|---|---|---|---|
| 3,063,903 | 11/1962 | Wright | 260—239 |
| 3,154,538 | 10/1964 | Lima | 260—239 |
| 3,239,503 | 3/1966 | Korger et al. | 260—239 |

ALTON D. ROLLINS, Primary Examiner